Patented June 13, 1950

2,511,060

UNITED STATES PATENT OFFICE 2,511,060

WATER-SENSITIVE CELLULOSE DERIVATIVES

John P. Hollihan, Jr., Garden City, and Sanford A. Moss, Jr., Ridley Park, Pa., assignors to American Viscose Corporation, Wilmington, Del., a corporation of Delaware No Drawing. Application October 5, 1945, Serial No. 620,641

2 Claims. (Cl. 260—231)

This invention relates to carboxyethylated cellulose, and to artificial fibers or filaments, yarns, films, and other articles formed therefrom.

As disclosed in our copending application, Serial No. 549,290, filed August 12, 1944, now Patent No. 2,492,428 issued December 27, 1949, when acrylonitrile is added to viscose, a portion thereof reacts with the sulfur-containing by-products produced upon hydrolysis of the cellulose xanthate, and the remainder reacts directly with the cellulose xanthate in the dissolved state, the latter reaction being catalyzed by the sodium hydroxide present in the viscose.

In accordance with the present invention, acrylonitrile is added to viscose in controlled amounts and the mixture is permitted to stand until all or substantially all of the cyanoethyl groups introduced by direct reaction between the acrylonitrile and dissolved cellulose xanthate are hydrolyzed to carboxyethyl groups, as evidenced by the fact that nitrogen is not detectable by ordinary analytical procedures.

The invention provides carboxyethyl cellulose in a new form, in which, because reaction takes places between the acrylonitrile and the cellulose xanthate in the dissolved state, the carboxyethyl groups are uniformly distributed within and through the cellulose phase, as proved by the results of X-ray examinations. Fibers, filaments, or other shaped articles or masses formed from the new carboxyethylated cellulose have valuable properties in that they comprise cellulose in a more highly reactive form than has been the case heretofore, and possess the property of controlled water-sensitivity, the degree of which can be accurately and reproducibly predetermined within wide limits depending upon the proportion of carboxyethyl groups to anhydroglucose units of the cellulose. Preferably, the proportion of carboxyethyl groups to glucose units is comparatively low, ranging from about one carboxyethyl group per seven anhydroglucose units to about one carboxyethyl group per about 110 anhydroglucose units, depending upon the amount of acrylonitrile added to the viscose, which may be in the range of from about 1 to 10%, and is usually in the range of from about 1 to 6%, and preferably is in the range of 1 to 5% to yield, upon hydrolysis, a carboxyethylated cellulose in which the proportion of carboxyethyl substituent groups to anhydroglucose units ranges from about 1:110 to 1:9. Fibers, and other articles obtained by shaping and coagulating the carboxyethylated cellulose of the invention are soluble in alkali and possess varying degrees of water-sensitivity, in proportion to the carboxyethyl content, fibers and other articles being obtained which may be comparatively water-insensitive at one extreme, or which are actually water-soluble, at the other extreme, the extent of water-sensitivity, that is the ability to pick up and retain water, being accurately and controllably predeterminable by choice of the amount of acrylonitrile to be added to the viscose, within the limits herein delineated, provided always that prior to spinning the composition to fibers, or otherwise forming the same, substantially all of the cyanoethyl groups introduced by the acrylonitrile are hydrolyzed.

Preferably, the acrylonitrile and viscose are mixed, with stirring, at temperatures which are maintained at 40° C. or below, in order to prevent polymerization of the acrylonitrile, and the mixture is permitted to stand for a period of time which varies for various additive amounts of acrylonitrile, but which is of sufficient duration to permit conversion of the carboxyethyl groups to cyanoethyl groups by hydrolysis. When the acrylonitrile is added in amounts in excess of 2%, it may be added in incremental quantities and, optionally, the viscose may be allowed to re-age between such incremental additions.

The presence of the carboxyethyl groups distributed uniformly within and through the cellulose phase has a plasticizing effect upon the viscose which, when coagulated with sodium chloride solution, gives a soft, plastic coagulum. Articles formed therefrom have modified properties as compared, for example, with articles formed from ordinary regenerated cellulose. For instance, fibers obtained by spinning the new carboxyethylated cellulose into an aqueous sulfuric acid bath, in accordance with wet spinning technique, are characterized by inherent plasticity, and accept a higher degree of stretch during spinning than is usually possible, those obtained under the preferred conditions of the invention being capable of being stretched as much as 50% or more than conventional viscose rayon fibers.

The fibers compare favorably with standard viscose rayon fibers as respects their dry tensile strengths, but usually have decreased wet strengths and dry and wet extensibilities, the decrease in wet strength and extensibilities being proportional, generally speaking, to increase in amounts of acrylonitrile added to the viscose. The fibers are characterized by substantially a round cross-section and by the fact that, in contrast to conventional viscose rayon fibers, they do not tend to shrink noticeably during drying, or shrink to only a very slight extent, the final dried fibers having substantially the same extended structure as the fibers leaving the spinning bath. Other articles formed from the carboxyethylated cellulose also retain their original extended structure after drying.

It has also been found that carboxyethyl groups uniformly distributed within and through the cellulose phase have the effect of modifying, to the extent of substantially improving, the affinity of the cellulose for dyestuffs, this result being most pronounced in the case of basic dyestuffs.

That the carboxyethylated cellulose of the invention is more highly reactive than regenerated cellulose per se is shown by the fact that cross-linking of the cellulose chains is more readily accomplished when the new carboxyethylated cellulose is reacted with such agents as formaldehyde or urea-formaldehyde in accordance with usual cross-linking procedures.

The new carboxyethylated cellulose has been found to be about 40% more reactive in cross-linking tests with formaldehyde or urea-formaldehyde. This pronounced reactivity of the carboxyethylated cellulose of the invention is believed to be attributable to the uniformity of distribution of the bulky carboxyethyl groups in and through the cellulose phase, which has the effect of forcing the cellulose chains apart, the polar groups of the chains being thus made more readily available for reaction.

The following table will illustrate the results obtained by adding varying amounts of acrylonitrile to a viscose obtained from 50% wood pulp and 50% cotton pulp, and analyzing from about 1.9 to about 2.5% total sulfur, from about 6 to 9% sodium hydroxide (based on percent weight in viscose), from about 6 to 9% by weight cellulose, and having a normal salt point (about 4.5 to 5.0), permitting the mixture to stand until hydrolysis of the cyanoethyl groups to carboxyethyl groups was substantially complete (about 70 hours), and spinning the carboxyethylated cellulose into an aqueous spinning bath containing 11% sulfuric acid, 20% sodium sulfate, and about 5% zinc sulfate.

| Acrylonitrile Added | Per Cent Carboxyls | Average No. of Glucose Units per Carboxyl Group | Spinning Stretch | Tensils, g/d. | | Extensibility | |
|---|---|---|---|---|---|---|---|
| | | | | dry | wet | dry | wet |
| | | | Per Cent | | | | |
| 1% | 0.25 | 110 | 36 | 2.36 | 1.37 | 14.3 | 23.2 |
| 2% | 0.61 | 45 | 31 | 2.32 | 1.08 | 17.3 | 26.1 |
| 3% | 1.37 | 20 | 44 | 2.32 | 0.99 | 10.6 | 16.3 |
| 4% | 1.72 | 16 | 59 | 2.36 | 0.93 | 7.7 | 9.6 |
| 5% | 2.90 | 9.1 | 43 | 1.59 | 0.46 | 8.4 | 10.8 |
| 6% | 3.50 | 7.4 | 85 | 1.68 | 0.57 | 3.8 | 4.8 |

The constitution of both the viscose and the spinning bath may be varied widely, but preferably the spinning bath contains from 11 to 12.5% sulfuric acid, from about 20 to 25% sodium sulfate, and a relatively high proportion of zinc sulfate. Instead of using zinc sulfate in the bath, it may be replaced by or used in combination with other inorganic salts or metals, preferably metallic sulfates having a minimum solubility of 5% in sulfuric acid solution of from 6 to 15% concentration as for instance the sulfates of iron, magnesium, chromium, cadmium, manganese, nickel, or aluminum, preferably in proportions of 5% or more.

Fibers, yarns, films and other shaped masses formed from the carboxyethylated cellulose of the invention may be used for a variety of important purposes. For instance, fibers formed from the more highly water-sensitive carboxyethylated cellulose are particularly useful for embodiment in absorbing towelling, surgical bandages, etc., while, in the extreme case, where the carboxyethylated cellulose is water-soluble and actually constitutes an absorbable cellulose such as has not been available previously, articles formed therefrom may be used as a hemostatic agent in post-operative cases, for instance, where severe hemorrhage is a problem.

Fabrics formed from the water-soluble carboxyethylated cellulose fibers constitute relatively inexpensive foundation or ground fabrics for use in the manufacture of lace, embroidery or the like which may be stitched or formed on the ground fabric, which will serve as a support therefor, during formation thereof, after which the ground fabric may be easily, quickly and cheaply removed by treating the structure with water to dissolve away the water-soluble cellulose fibers.

Interesting effects may also be obtained by forming yarns consisting of the water-soluble carboxyethylated cellulose fibers and yarns consisting of other fibers into a fabric having various designs, and then dissolving out the carboxyethylated cellulose yarns by means of water to produce beautiful designs of lace-like effect in the fabric.

Other important uses for the new carboxyethylated cellulose, and particularly for the absorbable cellulose, will be apparent to those skilled in the art.

Variations may be made, of course, in the specific conditions outlined above, by way of exemplification, without departing from the spirit and scope of the invention and of the appended claims.

This application is a continuation-in-part of our application Serial No. 549,290, filed August 12, 1944.

We claim:

1. The process comprising mixing acrylonitrile with viscose at a temperature of 40° C. to produce, by direct reaction of the acrylonitrile with the dissolved cellulose xanthate, a cyanoethyl cellulose xanthate in which the cyanoethyl groups are substantially uniformly distributed along each of the molecular chains at all portions of the cellulose, and thereafter effecting hydrolysis of substantially all of the cyanoethyl groups to carboxyethyl groups to produce a carboxyethyl cellulose in which the carboxyethyl groups are substantially uniformly distributed along each of the molecular chains at all portions of the cellulose.

2. The process comprising mixing from 1 to 6% acrylonitrile with viscose at a temperature of 40° C. to produce, by direct reaction of the acrylonitrile with the dissolved cellulose xanthate, a cyanoethyl cellulose xanthate in which the cyanoethyl groups are substantially uniformly distributed along each of the molecular chains at all portions of the cellulose, and thereafter effecting hydrolysis of substantially all of the cyanoethyl groups to carboxyethyl groups to produce a carboxyethyl cellulose in which the carboxyethyl groups are substantially uniformly distributed along each of the molecular chains at all portions of the cellulose, and the proportion of carboxyethyl groups to anhydroglucose units of the cellulose ranges from about 1:110 to 1:7.

JOHN P. HOLLIHAN, Jr.
SANFORD A. MOSS, Jr.

REFERENCES CITED

The following references are of record in the file of this patent:

UNITED STATES PATENTS

| Number | Name | Date |
|---|---|---|
| 1,188,376 | Lilienfeld | June 20, 1916 |
| 2,087,981 | Lilienfeld | July 27, 1937 |
| 2,114,915 | Davis | Apr. 19, 1938 |
| 2,302,077 | Von Kohorn | Nov. 17, 1942 |
| 2,332,048 | Bock et al. | Oct. 19, 1943 |
| 2,332,049 | Bock et al. | Oct. 19, 1943 |
| 2,375,847 | Houtz | May 15, 1945 |